(No Model.)
A. B. C. DEBNAM.
SEED PLANTER.
No. 419,838. Patented Jan. 21, 1890.
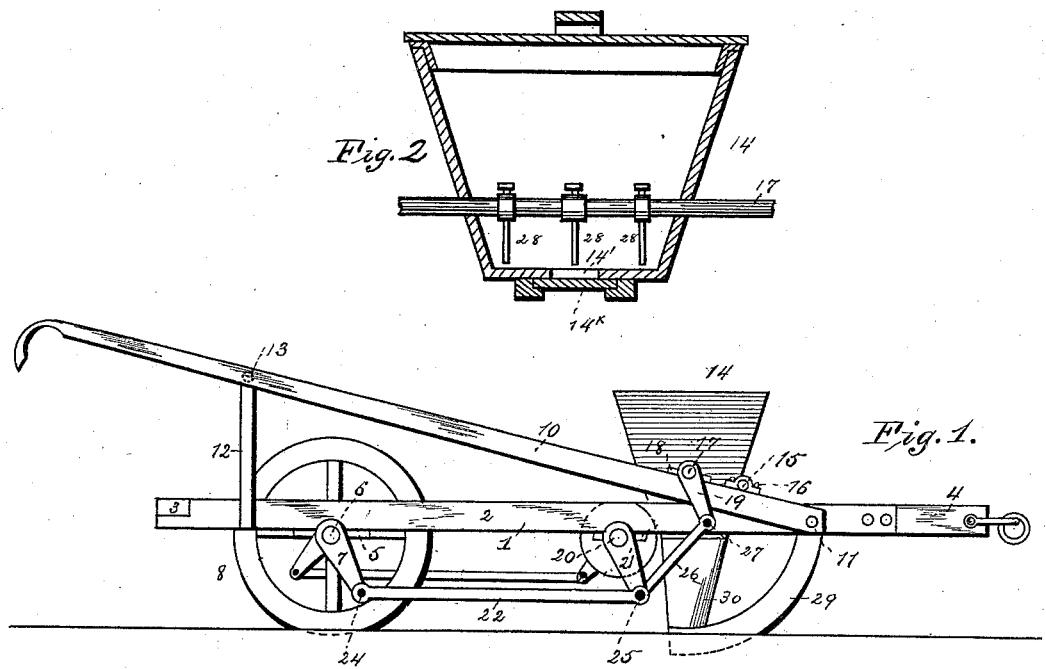
Witnesses
M. B. Harris
J. H. McElden
Inventor
A. B. C. Debnam
By Fitz Gerald & Co
Attorneys

UNITED STATES PATENT OFFICE.

ABRAHAM BURR CARSON DEBNAM, OF MEDINA, TENNESSEE.

SEED-PLANTER.

SPECIFICATION forming part of Letters Patent No. 419,838, dated January 21, 1890.

Application filed July 17, 1889. Serial No. 317,830. (No model.)

*To all whom it may concern:*

Be it known that I, ABRAHAM BURR CARSON DEBNAM, a citizen of the United States, residing at Medina, in the county of Gibson and State of Tennessee, have invented certain new and useful Improvements in Seed and Grain Planters; and I do hereby declare the following to be a full, clear, and exact description of the invention, such as will enable others skilled in the art to which it appertains to make and use the same.

My invention has relation to planters; and it consists in the construction and novel arrangement of parts, as hereinafter specified, illustrated in the drawings, and pointed out in the appended claim.

In the drawings, Figure 1 is a side elevation of my improved planter for cotton-seed and the like; Fig. 2, a vertical transverse section of the cotton-seed hopper.

Referring to Fig. 1 of the drawings, 1 indicates the main frame, preferably of triangular shape, as shown, consisting of the side beams 2 2 and the rear transverse bar 3 at the front ends of the side beams, and between the same is secured the bar 4, provided in its outer end with a clevis. Journaled in bearings 5, near the rear of the main frame, is a shaft 6, provided at each end with a crank 7, and has keyed upon its central portion the coverer-wheel 8, concaved on its face, as shown, and for keeping the concavity in the wheel free from foreign matter I provide a spring-scraper 9, secured upon the upper face of the transverse bar 3.

For readily guiding the planter, I provide the same with the rearwardly and upwardly inclined handles 10 10, secured at their front ends to the sides of the beams 2 2 by the bolt 11, said handles being braced near their rear ends by the vertical braces 12 and the transverse brace 13.

14 indicates the cotton-seed hopper removably secured on the handles 10 by the transverse brace-bar 15, secured to the handles by bolts 16 and provided in its bottom with an opening 14', closed by sliding door 14×.

17 indicates a rock-shaft passing through the hopper and journaled in bearings 18 on the upper faces of the handles. The outer end of the rock-shaft is provided with a crank 19, for a purpose presently explained.

20 indicates a crank-shaft journaled in bearings 21, secured to the under side of the side beams 2 2, as shown, and carrying at one end a crank 21'.

22 indicates a connecting-rod pivoted on the crank-pins 24 25 of the shafts 6 and 20, and is designed to impart a rocking motion to the rock-shaft 17 by means of the pitmen 26, pivoted at one end to the crank-pin 25 and at its opposite end to the crank-pin 27 on the crank 19.

In order to keep the seed within the hopper in an agitated condition, and thus insure its ready feeding through the opening 14', I secure on the rock-shaft 17, within the hopper, a series of stirrers 28.

Secured between the side beams 2 2, near their front meeting ends, is the sword or furrow-opener 29, of the usual well-known construction, and has secured at its lower end the bottom of the boot 30, the upper edge of which is fastened to the side beams.

The operation of my machine will be readily understood by those skilled in the art.

Having described my invention, what I claim is—

The combination, with the main frame, of the handles 10, secured thereto by the bolt 11 and braces 12 and 13, the hopper 14, removably secured on said handles by the brace-bar 15, secured to the handles by bolts 16 and provided with an opening 14', closed by a sliding door 14×, the rock-shaft 17, passing through the hopper and journaled in bearings on the upper faces of said handles, the stirrers 28, secured to said shaft within the hopper and provided at its end with a crank 19, the connecting-rod 22, pivoted to the cranks 7 and 21, and the pitman 26, connecting the cranks 19 and 21, all arranged substantially as specified.

In testimony whereof I affix my signature in presence of two witnesses.

ABRAHAM BURR CARSON DEBNAM.

Witnesses:
 B. A. TAYLOR,
 JAS. LAWS.